Aug. 24, 1954  H. B. WOOD  2,686,933
APPARATUS SUITABLE FOR MOLDING THERMOPLASTIC MATERIALS
Filed March 8, 1951
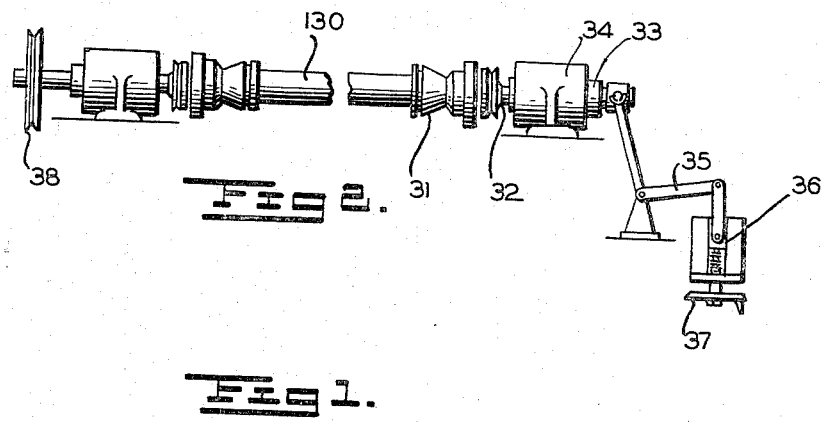
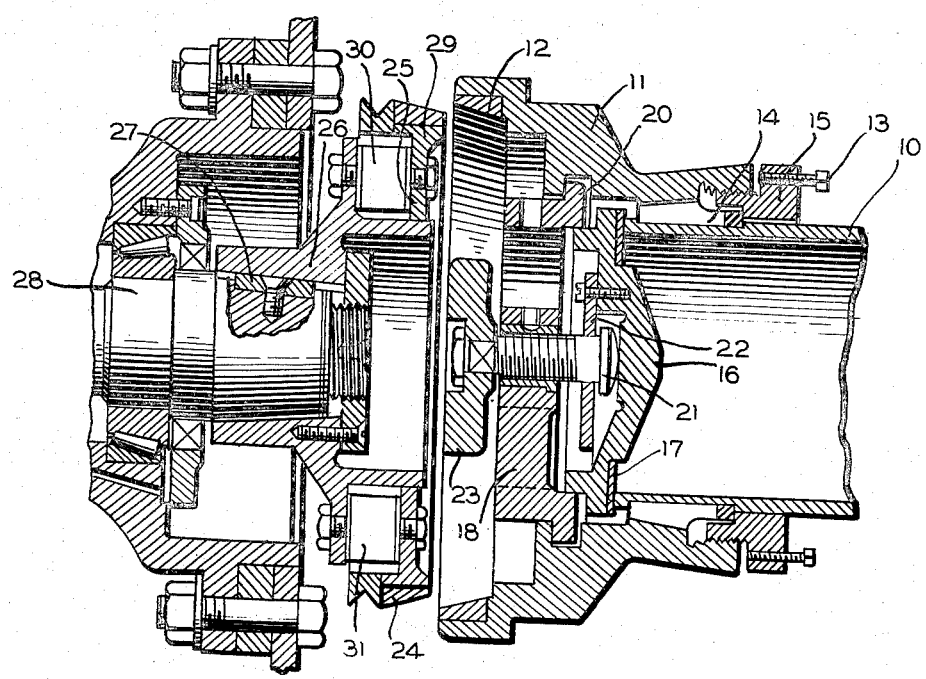
INVENTOR
HAROLD BROOMFIELD WOOD
BY
Cushman, Darby & Cushman
ATTORNEY Patented Aug. 24, 1954

2,686,933

UNITED STATES PATENT OFFICE 2,686,933

APPARATUS SUITABLE FOR MOLDING THERMOPLASTIC MATERIALS

Harold Broomfield Wood, Welwyn Garden City, England, assignor to Imperial Chemical Industries Limited, a corporation of Great Britain Application March 8, 1951, Serial No. 214,566

Claims priority, application Great Britain March 13, 1950

4 Claims. (Cl. 18—26)

This invention relates to moulds suitable for the production of tubes and liners for tubes, of internal circular cross-section, of thermoplastic resin compositions.

It has previously been proposed, for example, in British specification No. 475,552, to prepare articles such as tubes and liners for tubes of polymerised materials by part filling cylinders with polymerisable monomeric or partially polymerised substances and rotating the cylinder, thus subjecting the contents to the action of centrifugal force, while also subjecting the contents to the polymerising conditions. It has also been proposed, for example, in British specification No. 585,395 to prepare articles such as tubes and liners for tubes of organic thermoplastic material by introducing said material in a powder form into a hollow body or mould, rotating the body or mould so that a coating of powder is formed over its interior surface and thereafter applying heat while still rotating the body or mould until the particles of the powder fuse together to form a coherent layer over said interior surface and, if desired, removing the coherent layer from the body or mould.

In the performance of these methods it is necessary that the ends of the moulds should be adequately sealed as otherwise leakage takes place causing loss of raw materials. The methods of sealing used heretofore have been extremely unsatisfactory. It is also essential that while being subjected to centrifugal force the moulds should be free from inaccuracy of rotation and vibration, especially during the period when the material is changing from a fluid to a solid form, since any vibration will cause ripples to form on the interior surface of the moulded tube. The methods of mounting the mould used previously have not been such as would easily achieve accuracy of rotation and freedom from vibration and hence it has been extremely difficult to produce tubes and liners of high quality.

The object of the present invention is to provide an apparatus for the production of tubes or liners for hollow tubes of circular cross-section of organic thermoplastic material, said apparatus being substantially free from inaccuracy of rotation and vibration when in use, and said tubes or liners being consequently free from ripples on their interior surface.

According to the present invention, this object is accomplished by a centrifugal apparatus which comprises an axially symmetrical mould open at each end, closures for closing the ends of the mould, said closures being maintained in the closed position by a means operating against mould end fittings, said mould end fittings being adapted to connect the mould with end supports positioned to support the mould horizontally, at least one of said end supports being retractable to permit the removal or placing in position of the moud and at least one of said end supports providing a drive to rotate the mould about its longitudinal axis of symmetry, the axis of rotation of said end supports and said axis of symmetry being collinear.

In the attached drawings Figure 1 illustrates, in mid-sectional elevation, one embodiment of my invention. The drawing illustrates part of the mould with the end fitting attached and the mould closure in position. The drawing also illustrates a part of the drive and the corresponding end support for the mould. For the sake of clarity the end fitting is shown separated from the driving end support although it will be appreciated that when the apparatus is in use, these two parts will be in contact. Figure 2 illustrates a diagrammatic side view of this embodiment of my invention. Neither of the attached drawings is to scale.

One end of the mould, which is a hollow tube having a circular internal cross-section normal to the axis of the bore of the tube is shown at 10. The end fitting 11 is in the form of a sleeve portion which extends over the end of the mould and is attached thereto by means of the split collet 14 and the threaded draw ring 15, and an end portion integral with the sleeve portion which extends beyond the end of the mould and which is of circular cross-section concentric with the bore of the mould. The internal diameter of the end portion is greater than the diameter of the mould closure.

This extending end portion of the end fitting 11 is provided with the brass liner 12 whose bore is the internal surface of the frustrum of a cone co-axial with the bore of the mould.

The mould is closed by the cloure 16, which abuts on the end of the mould and there is interposed between the end of the mould and the closure the compressible gasket 17.

There is also provided a spider 18 whose lugs engage with an internal concentric groove in the mould end fitting. Two of these lugs are shown at 19 and 20.

There is also provided a compression screw which passes through the plate 22 attached to the mould closure, and which screws into the spider 18. This compression screw 21 can be rotated about its axis without causing movement of the mould closure in the same direction. The projecting end of this compression screw 21 is provided with a hand wheel 23 fastened thereto so that the mould closure may be pressed against the mould end or retracted therefrom by turning the hand wheel which is also provided with tommy-bar holes in order that sufficient pressure may be conveniently applied to the gasket 17 to prevent leakage of the contents of the mould.

The other end of the mould is similarly fitted with a mould closure, spider and end fittings to secure the mould closure.

The mould is supported horizontally and rotated by a retractable drive which comprises two shafts which are co-axial with the bore of the mould. A part of one of these shafts 28 is shown and on it is mounted the cone hub 26 secured by the key 27. The cone 29 is mounted on the cone hub in such a way that while it is free to move slightly in the direction of the axis of the shaft it is not free to move in any other direction. This is achieved by the portion 25 of the cone 29 being a close fit on the cone hub but free to slide endwise thereon, and its endwise movement being controlled by the limit of the resilience of the rubber mountings 30 and 31. The male conical surface is provided by the insert 24 of wear resisting material, which comprises asbestos fibers bonded with a phenol-formaldehyde resin, e. g. "Ferodo" (registered trade mark).

The shaft which supports the other end of the mould carries a cone ring which is mounted in a similar way.

One of the shafts is mounted in a fixed position and is free only to rotate about its axis. The other shaft (not shown) is fitted with means to enable it to be retracted longitudinally from the operating position. The fixed shaft is provided with a driving means while the other shaft is free to rotate on its axis. Both shafts are mounted on adjustable tapered roller bearings. The roller bearings of the free shaft are housed in a cylindrical housing which is free to be adjusted by movement in the direction of the axis of the shaft. This movement is achieved by means of a hand wheel operating a sliding block and bell-crank system, and a spring is provided between the spring housing on which the bell-crank acts and the cylindrical shaft housing to control the intensity of longitudinal pressure between the complementary mould support cone rings.

In using this moulding apparatus, one end of the mould is closed by a mould closure supported in the mould end fitting, the requisite amount of raw material is fed into the tubular mould and the mould closed by means of the second closure. The retractable shaft is then retracted, the mould, which is being supported, e. g. by a cradle, placed in alignment with the cone rings and the retractable shaft moved into a position such that the mould is held firmly between the two cone rings and the frictional contact between the female cone surfaces of the end fittings and the male cone rings of the end supports is such that the mould can be rotated about its axis. The mould is then rotated at sufficient speed to ensure uniform contrifugal distribution of the contents of the mould against its internal cylindrical walls, and the contents are subjected to polymerising conditions, if the contents are to be polymerised, or, if the contents consist of organic thermoplastic material, heat is applied. When a solid tube has been formed the mould is, if necessary, cooled, dismantled and the moulded tube removed.

Figure 2 illustrates diagrammatically the assembled apparatus but does not show the means for heating the mould.

In the diagram 130 is the mould and 131 is the mould end fitting. The cone hub 32 carries the cone ring which makes frictional contact with the conical surface of the end fitting 31. The cone hub is keyed to the retractable shaft which is mounted in the cylindrical housing 33 which is in turn mounted in the housing 34. The means for moving the retractable shaft are provided by the bell-crank 35 and the sliding block 36 and hand wheel 37.

The other end of the mould is similarly mounted but the shaft on which it is mounted is not retractable but carries instead a driving pulley 38.

The apparatus may be constructed from any suitable metal. For ease of handling I prefer that the mould, end fittings, mould closures and spiders should be made of an aluminium alloy containing a major proportion of aluminium. Thus in the specific embodiment, hereinbefore described, the mould is made from drawn aluminimum alloy tube, while the end fittings, mould closures and spiders are made from cast aluminium alloy.

The mould end fittings may be integral with the mould or they may be fastened thereto by any conventional method, e. g. by collet rings interposed between the end fittings and the external mould surface as hereinbefore described. Mould end fittings which are not integral with the mould may be left permanently in position once the surface or means which engages with the end support has been accurately formed with respect to the axis of the tube. This is particularly valuable since it means that the mould can be charged and the finished tube removed from the mould without the necessity of removing the end fitting from the mould. The mould closure preferably abuts against the end of the mould and it is desirable to interpose a gasket of flexible material between the end of the mould and mould closure.

The drive and the end supports for the mould must be such that the mould can be accurately rotated about its axis. This is best achieved by means of a frictional drive and by the use of complementary conical surfaces as hereinbefore described, since this permits simple and accurate assembly of the apparatus.

Owing to the inertia of the mould, scoring at the conical surfaces may occur when the apparatus is put into motion, unless suitable precautions are taken such as the provision of wear resisting surfaces. The conical surfaces may be provided by steel members or they may be provided by the combination of a bonded asbestos fiber male cone ring mounted on a cone hub and a brass liner mounted on the mould end fitting and having a complementary female conical surface. It will be appreciated that where material such as asbestos fibers bonded with phenol-formaldehyde resin and sold under the trade name "Ferodo" is used to provide a wear resisting surface it should not form part of the mould end fitting since its surface could be easily spoilt by spilling liquid polymerisable material on to it when liquid is being poured into the mould. Metal conical surfaces, on the other hand, can be easily wiped clean without suffering any damage and for this reason are preferred on the mould end fitting.

As a further means of preventing or reducing scoring at the conical surfaces I prefer that the cone rings are resiliently mounted on the drive in such a way that they are capable of slight movement in the direction of the axis of the mould but in no other direction. This can be achieved, as hereinbefore described, by mounting a cone ring on a cone hub which is in turn mounted on the drive, the cone hub having a projecting cylindrical portion over which the cone ring makes a sliding fit and the movement of the cone ring along this cylindrical portion being limited by rubber stops.

If desired the frictional drive may be provided by internal and external cylindrical surfaces. The drive transmission may also be provided by projections on the mould end fitting which engage with recesses on the end support, or vice versa, but since this method involves considerable difficulty in achieving accurate co-axial alignment of the mould and drive, it is not my preferred method.

The internal surface of the mould will conform to the desired external shape of the finished tube or liner and must be of such shape that the finished tube can be removed from the mould without difficulty. The external surface of the mould need not be of similar shape to the internal surface of the mould but it will be appreciated that the shape of the mould as a whole must be such that when the mould is rotating, there must be no unbalanced forces acting normally outwards from the axis of rotation.

Both shafts must be so mounted that no vibration takes place during rotation and this is achieved by the use of suitable bearings carried in sufficiently massive mountings. Tapered roller bearings adjusted to a slight longitudinal preload are preferred.

Heating means are also provided such that the rotating mould may be heated to any desired temperature. These may comprise any suitable known means, e. g. a spray of hot water may be directed on to the rotating tube, or where a greater temperature range is required the tube may be heated by electric heaters placed around the tube such that the tube rotates in a heated oven.

The apparatus may be used for the production of hollow tubes or liners, either by introducing organic thermoplastic polymeric material having a good heat stability at its softening point, e. g. the solid polymers of ethylene, into the mould and subjecting it to the centrifugal action of the rotating mould together with the application of heat and thereafter cooling, or by introducing polymerisable monomeric or partially polymerised material into the mould and subjecting it to the centrifugal action of the rotating tube and to polymerising conditions until a fully polymerised hollow tube is formed.

Suitable compounds which can be polymerised to yield thermoplastic solid material and which may be used in my apparatus for the production of tubes or liners are those containing the group $CH_2=C<$ and which are liquid at the temperature at which polymerisation is to be effected, e. g. esters of $\alpha$-substituted acrylic acids such as methyl, isopropyl, cyclohexyl and phenyl methacrylates. These monomeric materials may be used alone or in admixture with one another or in admixture with a minor proportion of compounds containing more than one unsaturated linkage, for example, allyl methacrylate or diallyl fumarate. They may be used in monomeric form or the monomer may contain dissolved polymer, or the monomer may be partially polymerised before introduction into the mould.

Ancillary ingredients may also be added to the contents of the mould, e. g. fillers, dyestuffs or plasticisers.

The speed at which the mould is rotated must be such that the inner surface of the finished tube or liner is free from ripples such as are caused by resonant vibration and this can only be decided with a particular apparatus by experience. Resonant vibration may occur if the speed is too low and it may also occur again at greatly increased speeds. Using the apparatus hereinbefore described, for the manufacture of polymethyl methacrylate tubes, I have found that a rate of rotation of 800 revolutions per minute has led to the production of tubes having their inner surfaces completely free from defects.

The production of tubes or liners having highly polished external surfaces can be achieved by the use of moulds having highly polished internal surfaces. The production of such internal mould surfaces is a difficult and expensive operation and I prefer therefore to use moulds having smooth internal surfaces and to subject the finished tube or liner when it is removed from the mould and after it has been subjected to any heat treatment processes, to a final polishing operation.

The finished tube or liner can usually be easily removed from the mould by placing the mould containing the finished tube or liner in a hot water bath and thereafter cooling in air when the shrinkage of the finished tube or liner is sufficient to permit its easy removal from the mould. In cases where removal of the tube or liner from the mould is found to be difficult suitable separating agents may be used to line the mould surface, e. g. high melting point greases, aluminium stearate and detergents such as "Lissapol" C (registered trade mark), which are surface-active agents.

My invention is illustrated but in no way limited by the following example which describes the use of the apparatus of Figures 1 and 2.

*Example*

A polymerisable syrup was prepared by heating monomeric methyl methacrylate containing 0.002% by weight of benzoyl peroxide at 85° C. until the viscosity of the solution increased to 3–5 poises when measured at 20° C. After cooling the catalyst concentration was increased to 0.09% by weight and the syrup was subjected to a pressure of 22 inches of mercury for 30 minutes in order to remove dissolved air. The syrup was then filtered through a fine cambric cloth filter.

A tubular mould of circular cross-section made of aluminium alloy 5 ft. 8½ ins. long and of external diameter 6¾ ins. and internal diameter 6 ins. was purged with nitrogen to remove oxygen from inside the mould. The mould carried end fittings each secured by a split collet and draw ring and one end of the mould was then closed by a closure which carried a gasket made of plasticised polyvinyl chloride of the type sold under the trade name "Welvic." The mould was supported in a position slightly inclined to the vertical and 5,980 grams of the syrup were poured in. The open end of the mould was closed by a second mould closure also fitted with a Welvic (registered trade mark) gasket.

Each end fitting of the mould carried a brass liner having a female conical surface, the diameter of the brass liner at the open end of the end fitting being 8 inches. The conical surfaces of the end fittings were designed to make frictional contact with complementary male conical surfaces on the end supports. The male conical surfaces were formed on rings of Ferodo (registered trade-mark) attached to the end apparatus. One of the end supports was retractable and the other carried the drive.

The mould was supported in the horizontal position and placed between the end supports, the retractable end support was moved in so that the conical surfaces of the end fittings engaged with the conical surfaces of the end supports.

The mould was then rotated at the rate of 800 revolutions per minute. While being rotated the temperature of the mould was maintained at 52° C. for a period of 13 hours by means of a spray of water heated to that temperature. The temperature was then raised to 70° C. and the mould maintained at this temperature for 1 hour. At the end of this time, the rotation of the mould was stopped and the end support retracted and the mould removed from the driving apparatus.

Both mould closures were removed and the mould now containing a hollow tube of polymethyl methacrylate was placed in a bath of water maintained at 60° C. The temperature of the water bath was raised to 98° C. over a period of one hour and maintained at this temperature for a further period of one hour. The bath was then cooled to 60° C. over a period of one hour after which time the mould was removed and placed in an air oven at 60° C. The temperature of the air oven was raised to 100° C. over a period of 30 minutes, maintained at this temperature for a further period of 30 minutes and thereafter slowly cooled. In was found that the hollow tube of polymethyl methacrylate ¼ inch thick, was easily removed from the mould.

The outer surface of the hollow tube of polymethyl methacrylate was given a polishing treatment to remove slight blemishes. The inner surface of the resulting clear hollow tube was completely free from ripples or other defects.

I claim:

1. A centrifugal moulding apparatus for the production of tubes and tube liners of circular internal cross section, which comprises an axially symmetric mould open at each end, an end fitting secured to each end of said mould, a closure for completely closing each end of said mould, clamping means engageable with said end fittings for maintaining said closures in mould closing position whereby variable clamping pressure may be exerted upon said closures, and spaced end supports axially aligned on a horizontal axis, at least one of said end supports being retractable to permit the removal or positioning of a mould and at least one of said end supports providing a drive to rotate the mould about its longitudinal axis of symmetry, said end fittings directly engaging said end supports whereby the mould may be engaged and rotated without affecting the clamping pressure of said closures.

2. Apparatus according to claim 1 in which each of said end fittings comprises a portion which extends beyond the end of the mould, said portion having an internal circular cross section concentric with the bore of the mould and of greater diameter than the diameter of said mould closure.

3. Apparatus according to claim 1 in which said mould closure is provided with a compression screw which is attached to said closure by a means such that said compression screw may be rotated freely about its axis without rotating said mould closure, the head of said compression screw pressing against the exterior of the closure, the threaded part of said compression screw screwing into a plate in the form of a spider whose lugs engage with an internal concentric groove in the mould end fitting, and a hand wheel being provided such that the mould closure may be pressed against the end of the mould and retracted therefrom by rotation of said hand wheel.

4. Apparatus according to claim 1 in which the movement of said retractable end support is effected by moving the shaft housing on a sliding block by means of a bell-crank system.

References Cited in the file of this patent

UNITED STATES PATENTS

| Number | Name | Date |
|---|---|---|
| 1,155,054 | Franz | Sept. 28, 1915 |
| 1,318,520 | Wolever | Oct. 14, 1919 |
| 1,668,763 | Dickson | May 8, 1928 |
| 2,278,858 | Fields | Apr. 7, 1942 |
| 2,387,034 | Milano | Oct. 16, 1945 |
| 2,517,317 | Janco | Aug. 1, 1950 |